United States Patent [19]

Shoberg et al.

[11] Patent Number: 4,989,450

[45] Date of Patent: Feb. 5, 1991

[54] CABLE TENSIOMETER

[75] Inventors: Ralph Shoberg, Farmington Hills; Hossein Firouzegan, Wixom, both of Mich.

[73] Assignee: GSE, Inc., Farmington Hills, Mich.

[21] Appl. No.: 388,141

[22] Filed: Aug. 1, 1989

[51] Int. Cl.$^5$ ................................................ G01L 5/10
[52] U.S. Cl. ............................................ 73/158; 73/1 B; 73/862.48
[58] Field of Search ............... 73/158, 862.48, 862.45, 73/1 B, 862.47

[56] References Cited

U.S. PATENT DOCUMENTS

| | | | |
|---|---|---|---|
| 1,306,891 | 6/1919 | Grafton | 73/862.47 |
| 2,592,868 | 4/1952 | Cushman | 73/862.47 |
| 3,310,981 | 3/1967 | Nixon et al. | 73/862.45 |
| 4,587,855 | 5/1986 | Yamada et al. | 73/862.48 |

FOREIGN PATENT DOCUMENTS 0309980 12/1918 Fed. Rep. of Germany ... 73/862.47

Primary Examiner—Donald O. Woodiel
Attorney, Agent, or Firm—Krass & Young

[57] ABSTRACT

An improved tensiometer for measuring the amount of tension in a wire or cable comprises a hand-held sensor unit having a handle, two spaced support arms supporting cable-engaging support nibs, an extensible sensor nib protruding from the handle, and a trigger grip operable to extend the sensor nib upwardly between the support nibs to deflect a portion of cable clamped therebetween. The support nibs are eccentric and rotatably adjustable between a plurality of settings to permit the sensor unit to accommodate a number of different cable diameters, and the throw ratios of the nibs are arranged to minimize their eccentricity and the resulting variation in length of the deflected portion of cable at different settings. The sensor unit measures the force required to deflect the cable with a load cell, the output of which is converted into and displayed as a tension value by a microprocessor display meter connected to the sensor unit. The tensiometer is calibrated using a computerized linearization method to provide the microprocessor display meter with a linearization table for each diameter and type of cable to be tested.

15 Claims, 5 Drawing Sheets

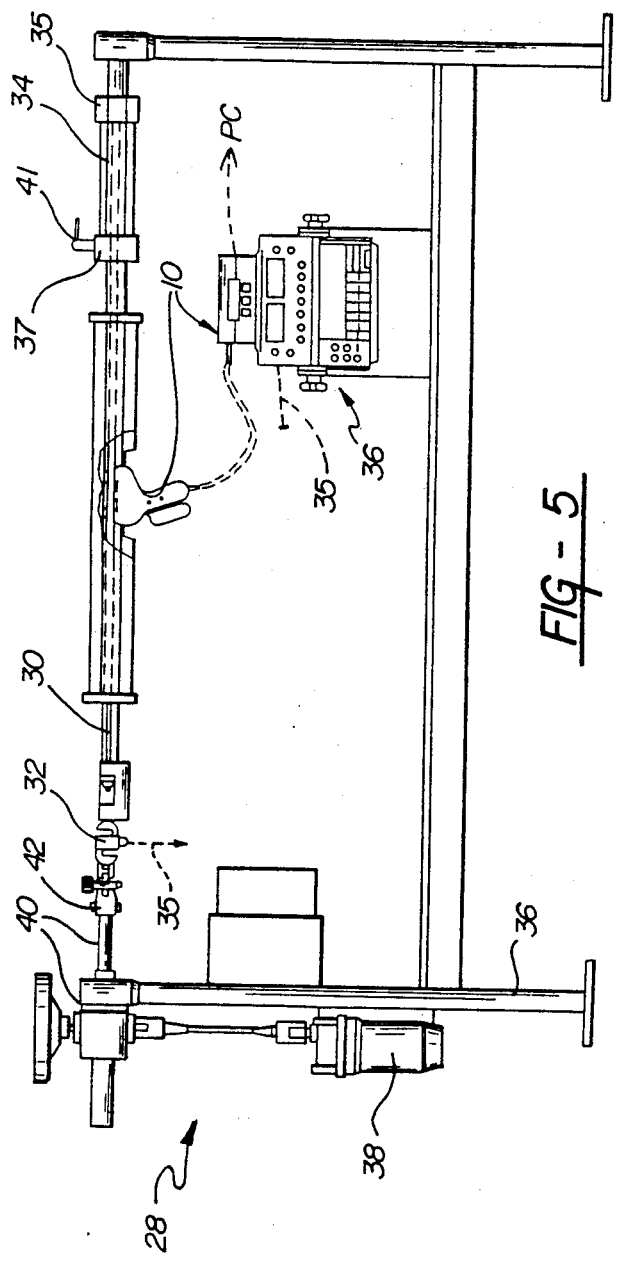
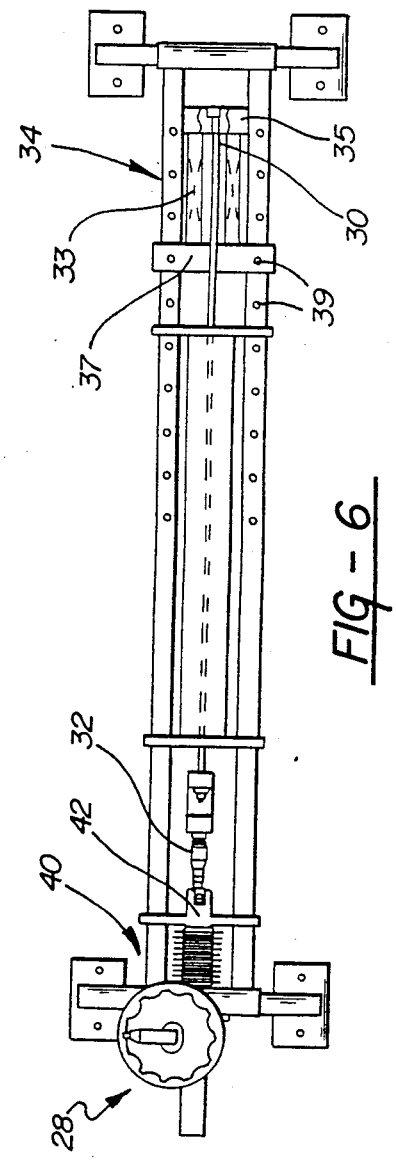

CALIBRATION DATA

FIGURE 7

DATE: Mon May 15 20:26:19 1989
OPERATOR: HF
REFERENCE CELL SERIAL NUMBER: 1736
CABLE SIZE: 1/4

MODEL NUMBER: 3500 LBS.
PROM VERSION 1.00 (450705-10000)
SERIAL NUMBER: 101

Tension Meter = A * (output*output) + B * (output) + C
where A = 6.14756e-006, B = 0.579045, C = -52.2108
Standard Deviation = 11.8446

| Reading Number | Target Tension | Meter Output | Ref. Tension | Calc. Tension | Tension Diff. | % Tension Diff. |
|---|---|---|---|---|---|---|
| 1-1 | 450.00 | 849 | 457.9 | 443.83 | -14.07 | -3.07 |
| 1-2 | 450.00 | 888 | 460.9 | 466.83 | 5.89 | 1.28 |
| 1-3 | 450.00 | 902 | 464.9 | 475.09 | 10.24 | 2.20 |
| 2-1 | 650.00 | 1220 | 657.5 | 663.37 | 5.90 | 0.90 |
| 2-2 | 650.00 | 1219 | 658.6 | 662.78 | 4.13 | 0.63 |
| 2-3 | 650.00 | 1241 | 663.1 | 675.85 | 12.80 | 1.93 |
| 3-1 | 750.00 | 1424 | 786.3 | 784.81 | -1.48 | -0.19 |
| 3-2 | 750.00 | 1444 | 787.2 | 796.75 | 9.57 | 1.22 |
| 3-3 | 750.00 | 1425 | 786.2 | 785.41 | -0.79 | -0.10 |
| 4-1 | 850.00 | 1523 | 853.4 | 843.93 | -9.43 | -1.10 |
| 4-2 | 850.00 | 1529 | 856.0 | 847.52 | -8.48 | -0.99 |
| 4-3 | 850.00 | 1555 | 859.5 | 863.07 | 3.54 | 0.41 |
| 5-1 | 950.00 | 1695 | 955.2 | 946.93 | -8.26 | -0.86 |
| 5-2 | 950.00 | 1698 | 959.0 | 948.73 | -10.28 | -1.07 |
| 5-3 | 950.00 | 1727 | 963.2 | 966.13 | 2.92 | 0.30 |
| 6-1 | 1100.00 | 1929 | 1105.3 | 1087.64 | -17.66 | -1.60 |
| 6-2 | 1100.00 | 1959 | 1111.1 | 1105.73 | -5.35 | -0.48 |
| 6-3 | 1100.00 | 1948 | 1115.2 | 1099.10 | -16.10 | -1.44 |
| 7-1 | 1200.00 | 2144 | 1218.5 | 1217.52 | -1.00 | -0.08 |
| 7-2 | 1200.00 | 2150 | 1221.0 | 1221.15 | -0.19 | 0.02 |
| 7-3 | 1200.00 | 2148 | 1225.0 | 1219.94 | -5.04 | -0.41 |
| 8-1 | 1350.00 | 2366 | 1359.0 | 1352.22 | -6.75 | -0.50 |
| 8-2 | 1350.00 | 2420 | 1366.3 | 1385.08 | 18.76 | 1.37 |
| 8-3 | 1350.00 | 2415 | 1369.6 | 1382.04 | 12.48 | 0.91 |
| 9-1 | 1550.00 | 2743 | 1561.2 | 1582.36 | 21.18 | 1.36 |
| 9-2 | 1550.00 | 2745 | 1565.5 | 1583.59 | 18.18 | 1.36 |
| 9-3 | 1550.00 | 2753 | 1568.5 | 1588.49 | 19.96 | 1.27 |
| 10-1 | 1800.00 | 3089 | 1807.0 | 1795.12 | -11.92 | -0.66 |
| 10-2 | 1800.00 | 3099 | 1813.9 | 1801.29 | -12.61 | -0.69 |
| 10-3 | 1800.00 | 3099 | 1817.7 | 1801.29 | -16.43 | -0.90 |

Linearization Table

FIGURE 8 a/d value = 0859    tension value = 0450
a/d value = 1197    tension value = 0650
a/d value = 1366    tension value = 0750
a/d value = 1533    tension value = 0850
a/d value = 1700    tension value = 0950
a/d value = 1949    tension value = 1100
a/d value = 2115    tension value = 1200
a/d value = 2362    tension value = 1350
a/d value = 2690    tension value = 1550
a/d value = 3097    tension value = 1800

4,989,450

CABLE TENSIOMETER

FIELD OF THE INVENTION

This invention relates to an improved apparatus for measuring the tension in a cable or wire and a method for calibrating the apparatus.

BACKGROUND OF THE INVENTION

There are many instances where the tension in a cable or wire is a critical factor in the operation and performance of a system; an example is the wire cable control system in an aircraft. Since there are typically many control cables even in a small aircraft, and since the performance of the aircraft depends on the cables having the proper tension, it is desirable to be able to obtain quick and consistently accurate tension readings of the cables for testing and adjustment purposes.

Hand-held tension testers or tensiometers are well-known in the art where a frame having first and second arms with cable-engaging portions is suspended from or clamped onto the cable being tested, and a cable-deflecting element supported by a central portion of the frame is urged against the cable to deflect it laterally between the cable-engaging portions. A spring scale mechanism connected to the cable-deflecting element registers a scale reading proportional to the force required to deflect the cable, and this reading is then typically referenced to a conversion table to determine the tension in the cable. Examples of such devices are disclosed in U.S. Pat. No. 4,135,393 to Jordan, U.S. Pat. No. 3,618,379 to Lipton, and U.S. Pat. No. 3,570,307 to Malriat and Milton.

Several disadvantages exist with such prior art tensiometers. In any given system, such as an aircraft, a variety of cable diameters are typically used. To be able to test cables of different diameters, prior art tensiometers are provided with removable, replaceable cable-deflecting elements which must be changed every time a different diameter cable is encountered. This is a time-consuming and relatively complicated procedure, and presents the problem of error in measurement due to incorrect matching of deflecting elements to a particular cable size.

Furthermore, the spring scale prior art devices described above are typically not very accurate and are very difficult to re-calibrate with any degree of accuracy. Very often the person using prior art tensiometers will have to estimate or guess at the tension in a cable based on known inaccuracies in the tensiometer. Also, frictional induced variability in the response of the mechanical spring scale mechanisms is a major limitation of the prior art.

SUMMARY OF THE INVENTION

The present invention is an adjustable, accurate, easily-calibrated tensiometer which overcomes the disadvantages of the prior art. In general, this is accomplished by way of a hand-held tension sensor having an essentially y-shaped frame with a cable support nib mounted on the end of each of its upper two arms and an extensible cable-deflecting sensor nib extending from the central handle portion of the frame between the two support nibs. The sensor unit is hung or clamped onto a cable with the cable lying between the support nibs and the sensor nib. A mechanical trigger or the like is operable to extend the sensor nib against the cable and deflect it laterally upwards between the support nibs. A sensor, for example a load cell sensor assembly, is connected to the sensor nib to generate an output signal corresponding to the force required to deflect the cable. A meter containing a microprocessor is connected to the tension sensor to convert the output signal from the load cell into a tension value for the cable.

To accommodate a wide variety of cable diameters, the sensor unit support nibs are adjustable between a number of positions to permit different cable sizes to be tested. In an illustrated embodiment, the support nibs are four-sided eccentric rollers rotatably adjustable between four different cable testing positions. The support nibs are also removably mounted to the sensor unit, so that if a given cable diameter falls outside the range of a first set of support nibs, a second set can be substituted.

It is desirable that the support nib be loaded in a manner as uniformly distributed as possible about the nib pivot center to maintain the accuracy of the tension measurement, regardless of the cable diameter. Accordingly, the throw ratios of the eccentric support nibs, rather than being consecutively incremented about the periphery of the nibs, are opposedly incremented to reduce the eccentricity or offset of the nibs. This minimizes the variation in the length of cable being deflected for varying cable diameters and ensures accurate, consistent tangential contact between the side surface of the support nib and the cable.

The load cell in the sensor unit generates an output signal corresponding to the force required to deflect the cable, and the microprocessor in the meter converts the output signal into a tension value which the meter displays. The meter microprocessor is provided with a linearization table for each size and type of cable to be tested for converting the sensor output to its equivalent tension value.

The linearization tables for each tensiometer are determined during calibration. A pre-determined range of actual cable tension values is selected for a particular test cable, the test cable is tensioned stepwise through the range, and the tension sensor is clamped on and operated at each step to generate an output signal corresponding to the tension in the wire. The tension of the test cable with the sensor unit clamped on is measured independently at each step to define a number of reference tension values.

Because the reference tension vs. sensor output relationship is non-linear, a computer connected to the tensiometer microprocessor during calibration linearizes the reference tension vs. sensor output signal curve. The computer then uses the linearized curve to determine a linearization table, representing a linearized tension vs. output signal curve for the particular diameter cable being tested within that range of actual tension values. The resulting table or tables are then loaded into the memory of the tensiometer microprocessor, which uses these tables to interpolate cable tension values for output signals generated by the sensor during actual testing and measurement.

Other features of the invention will become apparent upon further reading of the specification.

BRIEF DESCRIPTION OF THE ILLUSTRATED EMBODIMENT

FIGS. 5 and 6 are side and plan views, respectively, of an apparatus for testing and calibrating the tensiometer of the present mention;

FIG. 7 is a sample calibration report produced by the apparatus of FIG. 5.

FIG. 8 is a linearization Table.

DETAILED DESCRIPTION OF THE ILLUSTRATED EMBODIMENT

Figure 1:
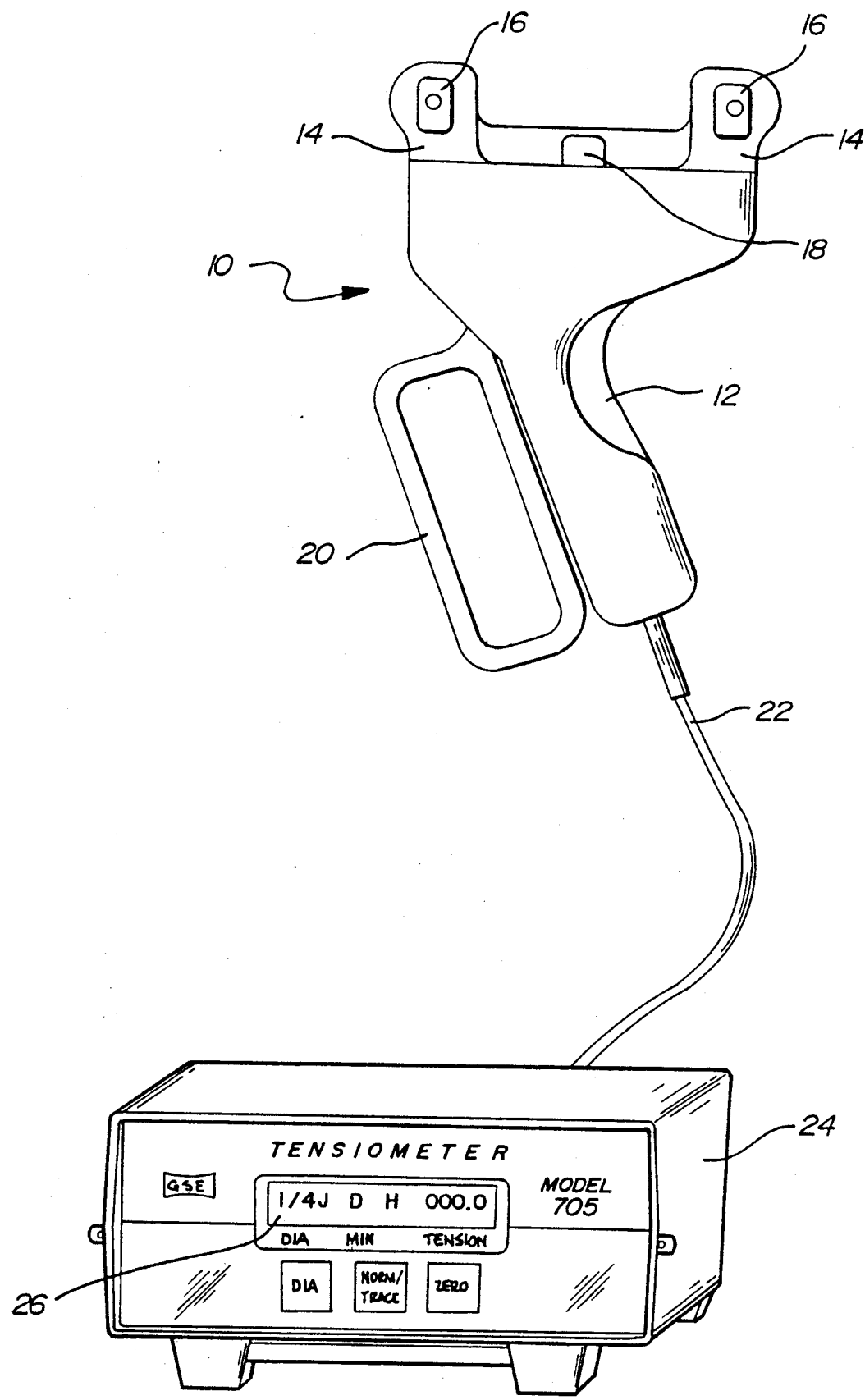
FIG. 1 is A perspective view of a tensiometer according to the present invention.

Referring now to FIG. 1, a portable tensiometer according to the present invention is shown. The tensiometer comprises a hand-held sensor unit 10 having a hollow handle portion 12, two spaced support arms 14 each supporting a support nib 16, an extensible sensor nib 18 protruding from the interior of the handle, and a pivoting trigger grip 20 operable to extend sensor nib 18 upwardly between support nibs 16. Sensor unit 10 is electrically connected by way of cable 22 to tensiometer display meter 24 having an LCD display screen 26 and an internal microprocessor (not shown).

Figure 2:
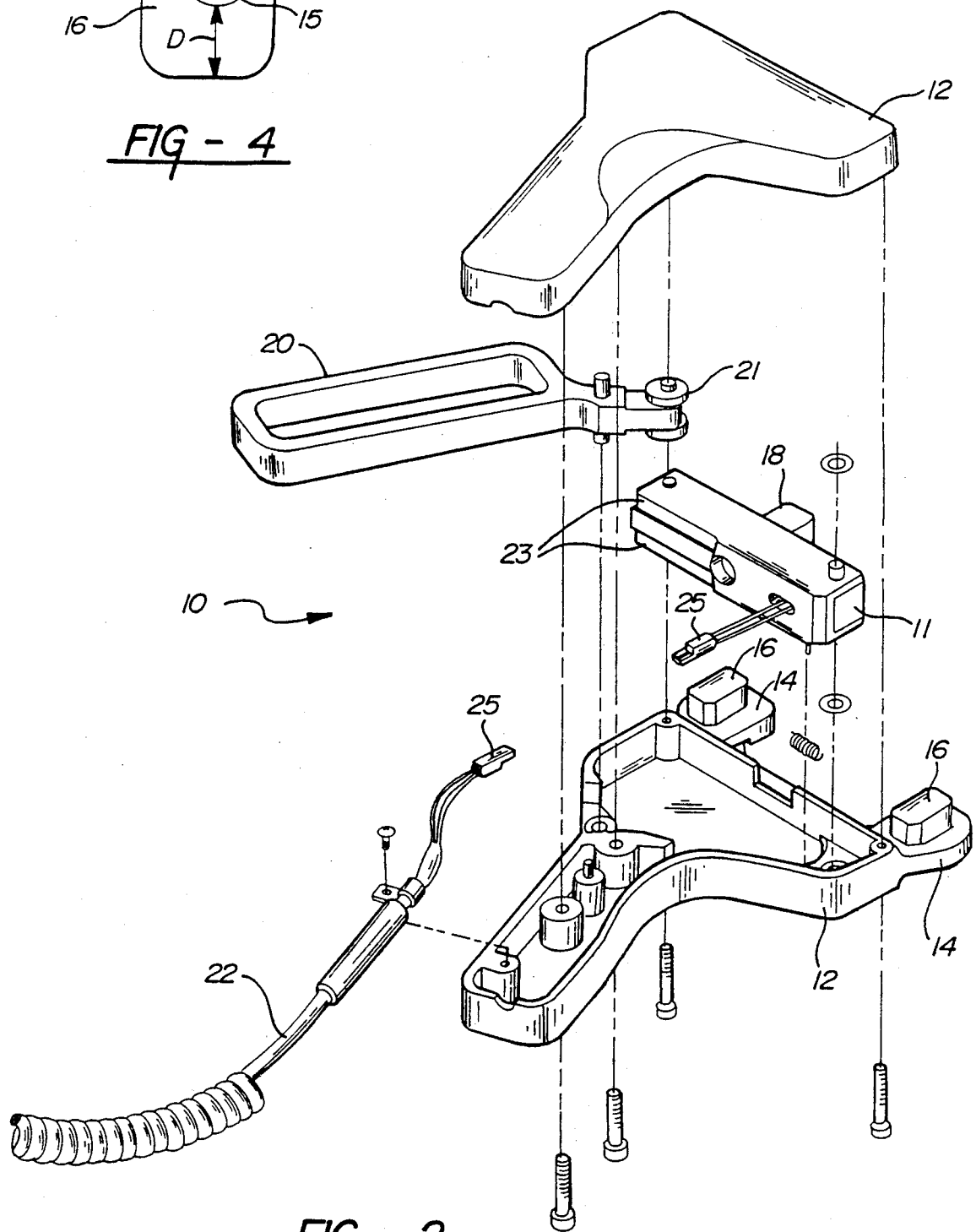
FIG. 2 is an exploded view of the tensiometer sensor unit of FIG. 1.

Referring to FIG. 2, sensor unit 10 can be seen to further comprise a load cell sensor assembly 11 of which sensor nib 18 is a part. Load cells of this type are well-known in the art, and any suitable type may be employed in sensor assembly 11. Trigger grip 20 includes bearings 21 mounted on its interior end to engage grooves 23 in sensor assembly 11. When trigger grip 21 is pivoted toward handle 12, sensor assembly 11 is forced upwardly to extend sensor nib 18 from the interior of frame 12. Sensor assembly 11 is electrically connected to cable 22 via wiring 25.

Figure 3:
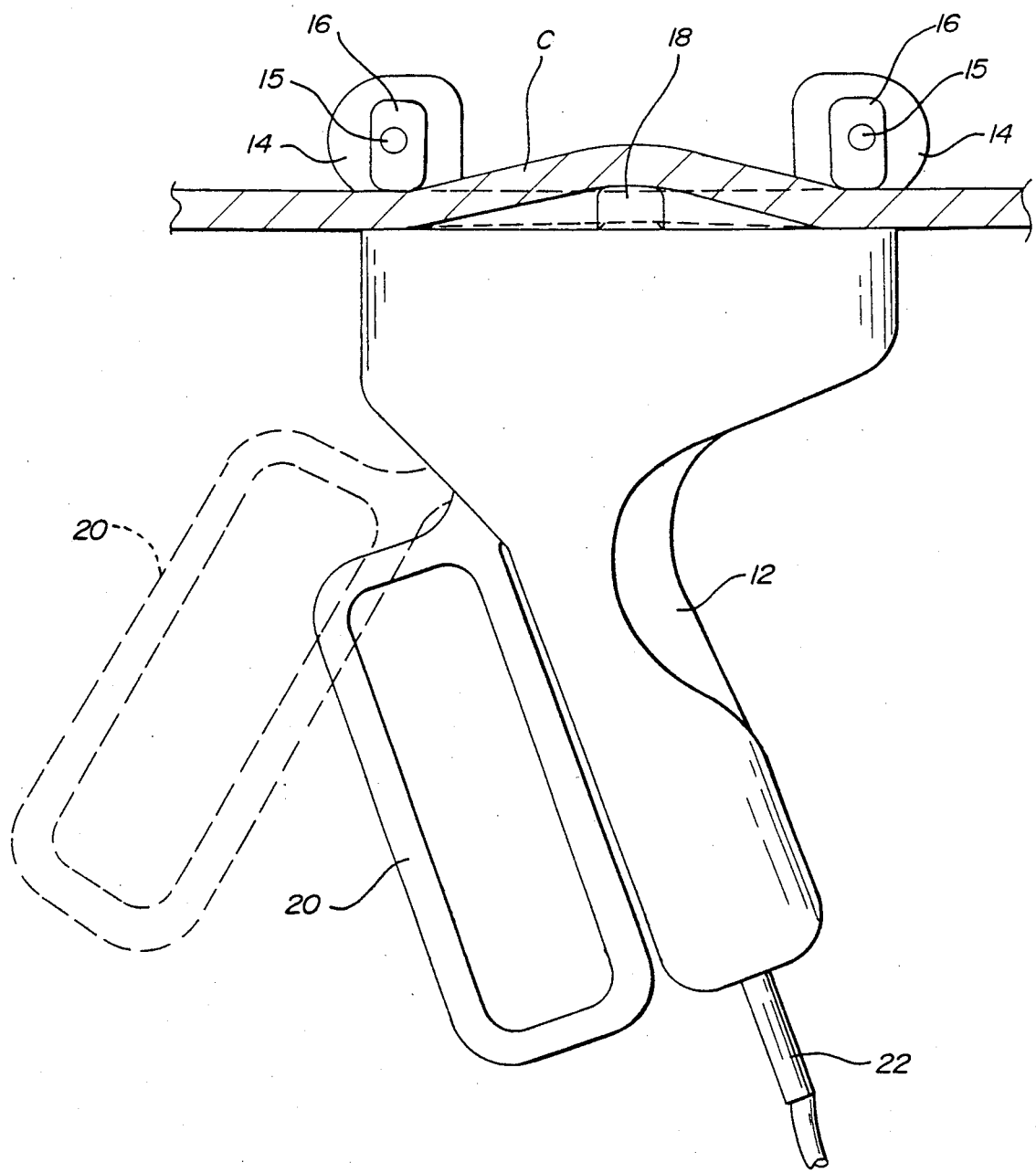
FIG. 3 illustrates the sensor unit of FIG. 1 clamped onto a wire cable.

In FIG. 3, sensor unit 10 is shown clamped onto a tensioned wire cable C, with the cable running between support nibs 16 and sensor nib 18. When trigger grip 20 is in the released, rest position shown in phantom, sensor nib 18 is retracted and cable C is essentially straight and undeflected. When trigger grip 20 is pivoted as shown in solid lines, sensor nib 18 is forced upwardly between support nibs 16 to deflect cable C. The force required to deflect cables C, which force is proportional to the tension in the line as is well-known in the art, is transferred through sensor nib 18 to the load cell sensor assembly, which generates a corresponding output signal. The output signal is transmitted via cable 22 to the microprocessor in display meter 24, which then determines and displays the amount of tension in cable C in a manner to be hereinafter described.

Figure 4:
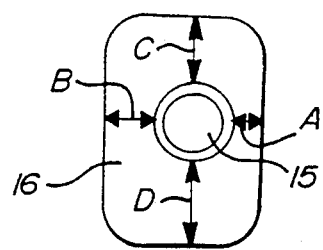
FIG. 4 illustrates in detail one embodiment of the support nibs of the sensor unit according to the present invention.

Because it is common for a person testing the tension in the cables of a system, for example the control cables in an aircraft, to encounter various types of cable with different diameters, the tensiometer of the present invention is designed to accommodate such differences. Referring to FIG. 4, support nibs 16 are shown rotatably mounted via pins 15 to support arms 14. The support nibs are eccentrically mounted on pins 15 to rotate between four different cable-engaging positions corresponding to each of their four sides, labeled A, B, C and D. Because support nibs 16 are eccentric, it can be seen that the vertical distance between the surface of the nibs adjacent the cable and the retracted sensor nib 18 will vary for each position.

Accordingly, four different diameters or ranges of diameters of cable can be accommodated by the sensor unit with only a rotational adjustment of support nibs 16 between positions A, B, C and D. Support nibs 16 are also removably mounted on pins 15 in a snap-fit, and can be replaced with a different pair of support nibs if a cable to be tested has a diameter which falls outside their range of adjustability.

Because support nibs 16 are eccentrically mounted, with varying throw ratios for each of cable engaging surfaces A, B, C and D, the length of cable being deflected between them will vary slightly according to the throw ratio of the surface engaging the cable. This difference in length will affect the accuracy of the tension measurement, more force being required proportionally to deflect a shorter portion of cable between the nibs than for a longer portion. To minimize variation in the length of cable C between the support nibs in their various positions, the throw ratios of sides A, B, C and D of each support nib are oppposedly incremented; i.e., sides A and B having the lowest throw ratios are opposed, and sides C and D having the highest throw ratios are opposed. In effect, the eccentricity of the nib contact surface relative to the nib pivot pins is minimized, ensuring the greatest possible consistency in deflected cable length between positions A, B, C and D.

Another advantage in minimizing the eccentricity of support nibs 16 is an increase in tangential contact between the cable and sides A, B, C and D of the nibs. Smooth, even tangential contact between the nib surfaces and the cable, as opposed to perpendicular point contact between the nib corners and cable, increases the accuracy of the tension measurement.

In use, an operator powers up meter 24, which in this illustrated embodiment is powered by a rechargable battery pack. The microprocessor in meter 24, for example a Motorola MC68HGC11A1, is programmed to compute tension values for a variety of cable types and diameters, and the operator can scroll through and select the diameter to be tested by pressing the appropriate key on meter 24. The meter then prompts the operator via display 26 to set support nibs 16 to a setting corresponding to the selected cable diameter. For example, for a one-quarter inch jacketed cable, the LCD display 26 might prompt the operator to rotate support nibs 16 to position D.

Once the support nibs are properly set, sensor unit 10 is clamped onto the cable to be tested as previously described, and sensor nib 18 is extended via trigger 20 to deflect the cable upwardly between the support nibs. An analog output signal corresponding to the amount of force required to deflect the cable is generated by the load cell sensor assembly in sensor unit 10, transmitted to the microprocessor in meter 24 via cable 22, and converted into and displayed as a cable tension value on LCD display 26.

The microprocessor in meter 24 is provided during its calibration with a linearization table for each size and type of cable to be tested. These tables are a range of values for the load cell output signal, in this illustrated embodiment analog to digital counts, and their corresponding tension values as determined during the calibration process. When a signal is received from the sensor unit, the microprocessor interpolates a tension value from this linearization table.

To provide each meter with its linearization tables, the tensiometer must be calibrated, or recalibrated in the case of a tensiometer which has been serviced or which has a mismatched sensor unit and display meter. Referring to FIGS. 5 and 6, an apparatus for calibrating the tensiometer of the present invention is generally shown at 28. Calibration apparatus 28 comprises a length of test cable 30 connected to and supported between a reference load cell 32 at one end and a spring rate compensator 34 at the other end, all mounted on a frame 36. A reciprocal motor 38 mounted on one end of the frame operates a pinion and rack assembly 40 connected to reference load cell 32 through linkage 42 to put tension on test cable 30 as desired. Reference load cell 32 in series with test cable 30 generates an output signal corresponding to the tension in test cable 30, which signal is transmitted via line to reference load cell instrumentation 36, where it is registered as a cable tension value.

Because a cable specimen under tension behaves like a spring, and since the test cable 30 used in the calibration apparatus is much shorter, for example, than a similar cable used in aircraft control systems, the spring rate compensator 34 connected to the opposite end of the test cable simulates the effect of the longer cables which are commonly encountered in real-life test situations. The spring rate compensator comprises a set of compression springs 33 mounted between test cable and fixture 35 and an adjustable frame abutment portion 37. It can be seen from the drawing that frame abutment portion 37 is adjustable with respect to frame 36 by way of holes 39 and screws 41 to vary the compression of springs 33.

To calibrate tensiometer 10 for a particular diameter of cable, a range of target tension values is first determined in accordance with the expected range of tensions to which that particular diameter cable is likely to be tensioned in an actual system. Test cable 30 is then tensioned to the first or lowest value in the range by way of calibration apparatus 28, sensor unit 10 is clamped on, and the portion of the test cable between the support nibs is deflected as shown in FIG. 5. The act of clamping the sensor unit on to test cable 30 and deflecting a portion of the cable increases the overall tension in the cable. This increase is registered by the reference load cell instrumentation as a reference tension; i.e., the postclamping tension on the test cable is the reference tension.

The load cell sensor assembly in the sensor unit generates its own output signal corresponding to the force required to deflect the test cable, which signal is transmitted to tensiometer display meter 24 and converted by the microprocessor to an analog to digital count. During calibration, however, the a/d (analog to digital) counts are transferred directly to a computer, such as a PC (not shown) to which the meter is connected, rather than being converted directly by the tensiometer microprocessor into a tension value.

Once the tension reading is taken at the first value in the range of target values, the sensor unit is unclamped and the test cable is tensioned step by step through the range of target values, with a tension test being performed at each step as described above. Referring now to FIG. 7, columns one and two of a sample calibration report produced by the PC show that a target tension range of 450 to 1800 pounds has been broken down into ten target values, with three readings being taken at each value, for a total of thirty readings. Of course, any desired number of incremented target tensions and readings per increment may be utilized, according to the needs of the person calibrating the apparatus.

The computer receives each of the reference tension values and corresponding a/d counts recorded by the tensiometer and uses the polynomial equation $y = ax^2 + bx + c$, where y is the cable tension, x is the sensor output in a/d counts, and a, b and c are correction coefficients, to determine a calculated cable tension value for each reading. The calculated tension values are shown in column five of FIG. 7. Because the tension vs. sensor output relationship is non-linear, the PC determines correction coefficients a, b and c to linearize the tension versus output curve corresponding to the reference tension values vs. sensor output values. The computer then inserts these coefficients into the equation and calculates tension values from the sensor output. The program or actual steps utilized by the computer to linearize this curve will be apparent to persons skilled in the art of computer programming, and as such it will not be further described.

Columns six and seven of FIG. 5 show the tension and percent tension differences between the reference and calculated tensions of columns four and five, respectively. The size and range of the differences in these columns provides a good general indication of the performance of the linearization equation and the consistency of the physical test parameters.

When correction coefficients have been determined to linearize the reference tension vs. sensor output relationship and compute the calculated tension values of column five, the computer creates a linearization table as shown in FIG. 8 for loading into the memory of the microprocessor in meter 24. This linearization table lists a sensor unit output signal a/d count value for each of the incremented target tension values at which a calibration reading was taken, and represents a linearized, ideal tension vs. sensor output curve for the particular size cable tested in the range of target tension values at which it was tested. When the same type of cable is tested in a real-life situation using the calibrated tensiometer, the cable tension (with the sensor unit clamped on) is determined by piecewise linear approximation to the curve represented by the linearization table.

It will be understood that a separate linearization table is stored in the tensiometer microprocessor memory for each diameter and type (jacketed, plain, etc.) of cable to be tested and for each range of target tension values applicable to each cable. Accordingly, the calibration process involves taking separate tension measurements throughout the desired calibration range in order to create a linearization table for a particular diameter cable.

To test the tension in the cable it is merely necessary to set the support nibs to the appropriate position, select the corresponding linearization table on the meter, clamp the sensor unit on the cable and squeeze the trigger to deflect the portion of the cable between the support nibs. The cable tension will then be displayed on the LCD display of the meter. The tensiometer is of course disconnected from the calibration apparatus and PC during actual testing of cable systems.

The calibration apparatus and associated PC can also be used to verify the accuracy of the calibrated tensiometer. Tension readings are taken by the tensiometer on a test cable in essentially the same manner used in the previously described calibration process, and the percent difference between the tension calculated by the tensiometer and the reference tension of the test cable is checked to see if it falls outside an absolute allowed range of error. If it does, the tensiometer can be recalibrated as described above.

It is also possible to provide the tensiometer microprocessor of the present invention with a tension setting mode in which the sensor unit is left clamped onto the cable to continuously measure and display the tension as the cable is adjusted. This and other possible modifications which lie within the scope of the claims will be apparent to those skilled in the art.

I claim:

1. An apparatus for measuring the tension in a cable or wire comprising:

a hand-held tension sensor supporting two spaced cable engaging support nibs and an extensible cable deflecting nib mediate said support nibs for removably clamping said tension sensor onto said cable therebetween;

means carried by said tension sensor for selectively extending said cable deflecting nib to deflect said cable laterally between said support nibs;

sensor means connected to said cable deflecting nib to generate an output signal corresponding to the force required to deflect said cable; wherein, said cable engaging support nibs are multisided and adjustable to accommodate a plurality of cable diameters.

2. Apparatus as defined in claim 1 wherein said support nibs comprise eccentric rollers rotatably adjustable between a plurality of cable engaging positions.

3. Apparatus as defined in claim 2 wherein said support nibs are removably fastened to said tension sensor.

4. Apparatus as defined in claim 1 wherein said sensor means connected to said cable deflecting nib comprises a load cell.

5. A tensiometer for measuring the tension in a cable or wire comprising:

a hand-held tension sensor supporting two spaced cable engaging support nibs and an extensible cable deflecting nib mediate said support nibs for removably clamping said tension sensor onto said cable therebetween;

trigger means carried by said tension sensor for selectively extending said cable deflecting nib to deflect said cable laterally between said support nibs;

load cell sensor means connected to said cable deflecting nib to generate an output signal corresponding to the force required to deflect said cable;

a microprocessor display meter connected to said load cell sensor means for converting said output signal into a cable tension value; wherein, said support nibs are adjustable to accommodate a plurality of cable diameters.

6. Apparatus as defined in claim 5 wherein said cable engaging elements are multi-sided eccentric rollers rotatably adjustable between a plurality of positions for engaging cables of different diameter.

7. Apparatus as defined in claim 5 wherein said display meter microprocessor has a linearization table stored in its memory for each diameter of cable that will be tested.

8. Apparatus as defined in claim 7 wherein said display meter microprocessor prompts the operator of said sensor unit to select a support nib cable engaging position corresponding to the diameter of cable being tested.

9. A method for calibrating the tensiometer of claim 5 comprising the steps of:

incrementally tensioning a test cable at a plurality of tensions within a pre-determined target range;

clamping said sensor unit onto said test cable to take at least one tension reading at each of said incremental target tensions;

independently measuring the tension in the test cable at each of said incremental target tensions with said sensor unit clamped thereon to define a plurality of reference tensions;

determining a linearized calibration curve equation from the referenced tension versus sensor output values;

creating a linearization table from said linearized calibration curve comprising a sensor output value for each of said incremental target tension values; and storing said linearization table in said display meter microprocessor.

10. In a tensiometer system comprising a hand-held sensor unit adapted to be clamped onto and deflect a portion of a tensioned cable to generate an electrical output signal corresponding to the force required to deflect said cable, and a microprocessor display meter for converting said output signal to a cable tension value, a method for calibrating the tensiometer comprising the steps of:

incrementally tensioning a test cable at a plurality of tensions within a pre-determined target range;

clamping said sensor unit onto said test cable to generate at least one output signal at each of said incremental target tensions;

independently measuring the tension in the test cable at each of said incremental target tensions with said sensor unit clamped thereon to define a plurality of reference tensions;

determining a linearized calibration curve equation from the reference tension versus sensor output values;

creating a linearization table from said linearized calibration curve comprising a sensor output value for each of said target tension values; and storing said linearization table in said display meter microprocessor.

11. Method as defined in claim 10 wherein one of said linearization tables is created and stored in said display microprocessor for each type and size of cable to be tested with said tensiometer.

12. Method as defined in claim 10 wherein said microprocessor display meter is connected to a computer, said computer receiving said target tension, reference tension and sensor output values to determine said linearized calibration curve and create said linearization table.

13. An apparatus for measuring the tension in a cable or wire comprising:

a hand-held tension sensor supporting two spaced cable engaging support nibs and an extensible cable deflecting nib intermediate said support nibs for removably clamping said tension sensor onto said cable therebetween;

means formed on said tension sensor for selectively extending said cable deflecting nib to deflect said cable laterally between said support nibs;

sensor means connected to said cable deflecting nib to generate an output signal corresponding to the force required to deflect said cable; wherein, said cable engaging support nibs comprise four-sided eccentric rollers rotatably adjustable between four cable engaging positions.

14. An apparatus for measuring the tension in a cable or wire comprising:
- a hand-held tension sensor supporting two spaced cable engaging support nibs and an extensible cable deflecting nib intermediate said support nibs for removably clamping said tension sensor onto said cable therebetween;
- means formed on said tension sensor for selectively extending said cable deflecting nib to deflect said cable laterally between said support nibs;
- sensor means connected to said cable deflecting nib to generate an output signal corresponding to the force required to deflect said cable; wherein,
  - said cable engaging support nibs comprise eccentric rollers rotatably adjustable to accommodate a plurality of cable diameters, said rollers having opposedly incremented throw ratios.

15. An apparatus for measuring the tension in a cable or wire comprising:
- a hand-held tension sensor supporting two spaced cable engaging support nibs and an extensible cable deflecting nib intermediate said support nibs for removably clamping said tension sensor onto said cable therebetween;
- means formed on said tension sensor for selectively extending said cable deflecting nib to deflect said cable laterally between said support nibs;
- sensor means connected to said cable deflecting nib to generate an output signal corresponding to the force required to deflect said cable; wherein,
  - said cable engaging support nibs are adjustable to accommodate a plurality of cable diameters and a microprocessor display meter is connected to said sensor means for connecting said output signal to a cable tension value.

* * * * *